(12) United States Patent
Snyder et al.

(10) Patent No.: US 11,420,146 B1
(45) Date of Patent: Aug. 23, 2022

(54) 3D PRINTED ENVIRONMENTAL CONTROL AND LIFE SUPPORT SYSTEM

(71) Applicant: MADE IN SPACE, INC., Moffett Field, CA (US)

(72) Inventors: Michael Snyder, Jacksonville, FL (US); Daniel Riley, Sunnyvale, CA (US)

(73) Assignee: REDWIRE SPACE, INC., Jacksonville, FL (US)

( * ) Notice: Subject to any disclaimer, the term of this patent is extended or adjusted under 35 U.S.C. 154(b) by 847 days.

(21) Appl. No.: 16/160,992

(22) Filed: Oct. 15, 2018

Related U.S. Application Data

(62) Division of application No. 15/155,216, filed on May 16, 2016, now Pat. No. 10,099,467.

(60) Provisional application No. 62/162,626, filed on May 15, 2015.

(51) Int. Cl.
| | |
|---|---|
| *B01D 46/00* | (2022.01) |
| *B33Y 80/00* | (2015.01) |
| *C25B 15/02* | (2021.01) |
| *C25B 1/04* | (2021.01) |
| *C25B 9/17* | (2021.01) |

(52) U.S. Cl.
CPC .......... *B01D 46/0001* (2013.01); *B33Y 80/00* (2014.12); *C25B 1/04* (2013.01); *C25B 9/17* (2021.01); *C25B 15/02* (2013.01); *Y02E 60/36* (2013.01)

(58) Field of Classification Search
None
See application file for complete search history.

(56) References Cited

U.S. PATENT DOCUMENTS

| | | | |
|---|---|---|---|
| 4,753,730 A | 6/1988 | Maurer | |
| 5,259,553 A * | 11/1993 | Shyu | F24F 1/022 236/49.3 |
| 2011/0030557 A1* | 2/2011 | Brownstein | D04H 1/46 95/273 |
| 2015/0209978 A1 | 7/2015 | Snyder et al. | |
| 2016/0068793 A1 | 3/2016 | Maggiore | |
| 2016/0082652 A1 | 3/2016 | Snyder et al. | |
| 2016/0107106 A1* | 4/2016 | Brown | B01D 45/04 210/496 |
| 2016/0107337 A1* | 4/2016 | Acerbo | B29B 17/04 264/143 |
| 2016/0167254 A1 | 6/2016 | Cushing et al. | |
| 2016/0207262 A1 | 7/2016 | Trowbridge | |
| 2016/0243759 A1 | 8/2016 | Snyder et al. | |

OTHER PUBLICATIONS

Microgravity Manufacturing Via Fused Deposition; NASA; Jul. 2003 by Cooper et al.*

(Continued)

*Primary Examiner* — Michael P. Rodriguez
(74) *Attorney, Agent, or Firm* — Terry M. Sanks, Esq.; Beusse Sanks, PLLC

(57) ABSTRACT

An environmental control unit including a particulate filter located within an airstream, the filter created with an additive manufacturing device that creates at least one of randomly sized layering of the filter and randomly oriented layering of the filter to provide for impeding varying sized particulates from passing through the filter.

18 Claims, 7 Drawing Sheets

(56) References Cited

OTHER PUBLICATIONS

Cooper et al., "Microgravity Manufacturing Via Fused Deposition," NASA, Jul. 2003, https://ntrs.nasa.gov/archive/nasa/casi.ntrs.nasa.gov/20030067856.pdf.
Crockett et al., ,"Fused Deposition Modeling Microgravity," NASA, 1999, http://sffsymposium.engr.utexas.edu/Manuscripts/1999/1999078-Crockett.pdf.

\* cited by examiner

3D PRINTED ENVIRONMENTAL CONTROL AND LIFE SUPPORT SYSTEM

CROSS-REFERENCE TO RELATED APPLICATIONS

This application is a Divisional of U.S. application Ser. No. 15/155,216 filed May 16, 2016, which claims the benefit of U.S. Provisional Application No. 62/162,626 filed May 15, 2015, the entire contents of which are incorporated herein by reference.

BACKGROUND

Embodiments relate to an environmental control unit ("ECU") and, more particularly, to a system and method providing for the ECU in which replacement parts are remanufactured, using additive manufacturing process, from recycled parts taken from the ECU.

Additive manufacturing techniques enable the rapid creation of objects, structures, portions thereof, prototypes, replacement parts, experimental parts, and make-shift items. Such items may be useful in inhospitable environments such as outer space, on a celestial body, aboard a marine vessel, underwater and remote environments. However, current additive manufacturing devices generally require a flat, stable, gravitationally-uniform environment throughout a build in order to successfully produce a part. Such conditions do not exist in such inhospitable environments as outer space, on or around other planets and celestial bodies, aboard spacecraft, aboard aircraft, on marine vessels (including submarines) or in other extreme environments. More specifically, current additive manufacturing devices cannot function in such environments due to, among other things, lack of gravity (e.g., in orbit, aboard a space station), low and high frequency vibration (e.g., aboard a marine vessel, on a submarine), unpredictable shocks (e.g., rocking and jostling of a marine vessel due to rough seas), and pitching or other alteration of the gravitational force relative to the build axis (e.g., during parabolic aircraft flight, a submarine rising or diving).

An environmental control and life support system ("ECLSS"), which is a type of an ECU, is a life support system that provides, or controls, functions needed to maintain life, such as, but not limited to, filtration, atmospheric pressure, fire detection and suppression, oxygen levels, waste management and water supply. A non-limiting example of an ECLSS currently in use is the ECLSS aboard the International Space Station ("ISS"). The highest priority for the ECLSS is the ISS atmosphere, but the system also collects, processes, and stores waste and water produced and used by the crew. This may involve recycling fluid from, toilet, and condensation from the air. If the ECLSS fails, the crew has a backup option in the form of bottled oxygen and solid fuel oxygen generation (SFOG) canisters.

To ensure that the amount of time the ECLSS is unavailable after failure is kept at a minimized delay, replacement parts are stored on the ISS. Not only do such replacement parts consume storage space on the ISS, but the cost to transport the replacement parts from earth to the ISS are extremely high, costing in excess of tens of millions of dollars, depending upon the weight of the payload or specific part. As further illustrated, currently, launch costs per kilogram to low Earth orbit (LEO) are well over $1,000 per kilogram. As of 2013, estimated cost per kilogram of the Atlas V® vehicle (available from United Launch Alliance, LLC of Centennial, Colo.) is $13,000. The Falcon 9 v. 1.1 vehicle (available from Space Exploration Technologies, Inc. of Hawthorne, Calif.) delivers payloads to LEO for $4,000 per kilogram.

Currently, the ECLSS aboard the ISS is a significant system that is housed within an equipment rack. Considering the confined space aboard the ISS, the ECLSS consumes space that may be used for other functions. The use of space is multiplied when considering that spare components for the ECLSS are likely stored on the ISS as well.

As another non-limiting example, similar storage issues and cost issues (though not as costly) are realized in aquatic environments, such as, but not limited to, a submarine in the midst of a mission where it is not supposed to rise to the surface or an underwater laboratory or station.

Users and manufacturers of an ECU would benefit from a modular ECU in which replacement parts may be created from material that is from the part to be replaced where the replacement part is additively manufactured in the environment where the ECU functions.

BRIEF SUMMARY

Embodiments disclose a method and system of an environmental control unit in which replacement parts are remanufactured, using additive manufacturing process, from recycled parts taken from the ECU. The method comprises breaking down a component with a recycler to reduce the component to a recycled material composition that includes an original material of the component and debris that attached to the component during prior use. The method further comprises applying the recycled material composition within an additive manufacturing device to create a recycled component. The method also comprises producing the recycled component from the additive manufacturing device, the recycled component material composition comprising both the original material of the component and the debris attached to the component.

An environmental control unit is also disclosed where the unit comprises a particulate filter located within an airstream, the filter created with an additive manufacturing device that operates to create at least one of randomly sized layering of the filter and randomly oriented layering of the filter to provide for impeding varying sized particulates from passing through the filter.

A system is also disclosed. The system comprises an environmental control unit. The environmental control unit comprises fan to control a flow of air in an airstream, a filter located within the air stream to filter particulates from the airstream, a duct to contain the air stream, and an electrolysis unit in the airstream. The system also comprises a recycler to breakdown at least one of the fan, filter, duct, and electrolysis into a recycled additive manufacturing filament. The system further comprises an additive manufacturing device to receive the recycled additive manufacturing filament to create a replacement for at least one of the fan, filter, duct, and electrolysis with an additive manufacturing process.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
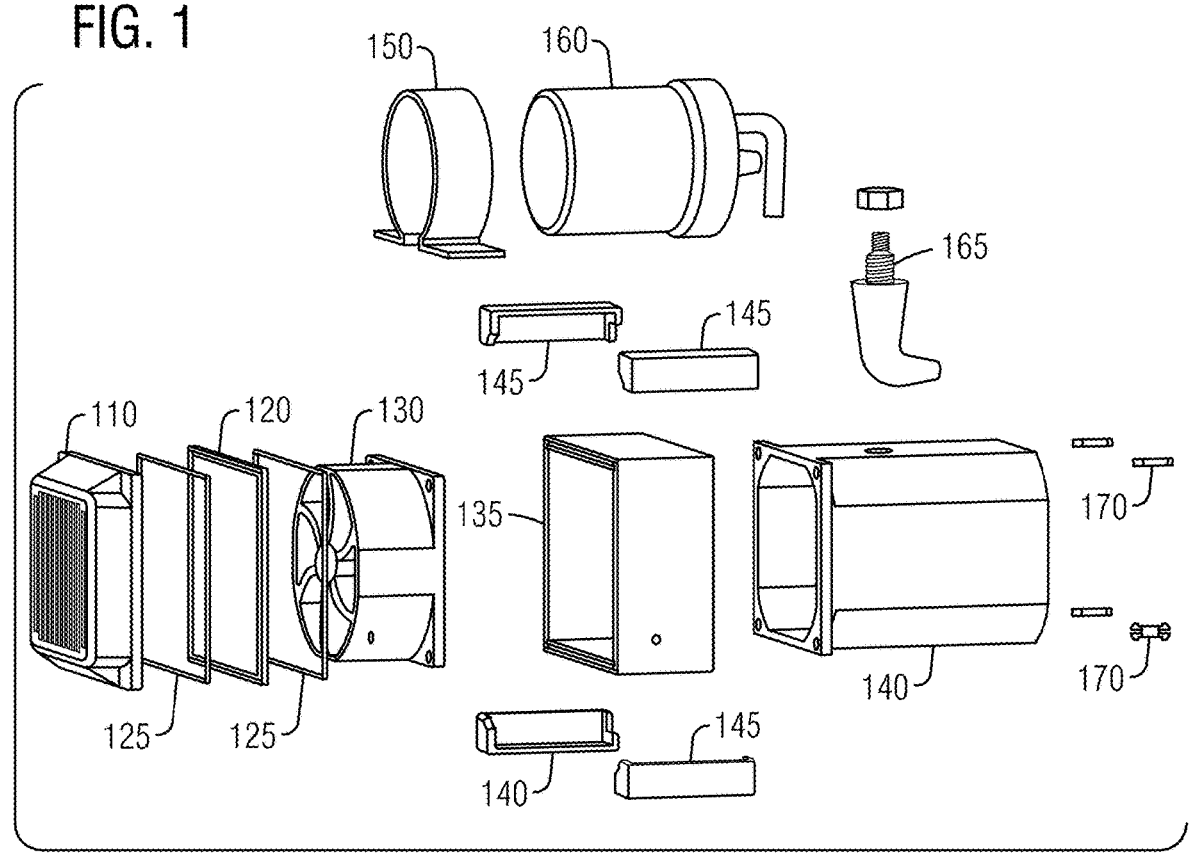
FIG. 1 shows an embodiment of an ECU with additively manufactured parts.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows an embodiment of an ECU with additively manufactured parts. The ECU is provided in a modular configuration to minimize space needed for the ECU. As shown, the ECU 100, or assembly, may comprise a front grill 110 provided to act as a large particulate filter as well as a clamp which holds a filter 120 in place. A rubberized gasket 125 may be included to seal the filter 120 in the assembly 100. Two rubberized gaskets 125 are illustrated. The filter 120 may be an air filter that functions as an air scrubber. The filter 120 may comprise a plurality of filters in a stackable configuration, disclosed herein as a stackable filter 120. The stackable filter 120 may feature randomly sized and oriented layering in order to filter out varying sized particulates from the air stream. In a non-limiting example, though the sizing and orientation may appear to be random, manufacturing the filter 120 may be done with a defined pattern, only the pattern is not readily recognizable by a human eye. The filter 120 may be configured to provide for large particulates geting caught in the filter as such particulates cannot fit through the holes provided in the filter. Smaller particulate may also become captured, or get caught, in the filter by becoming embedded into the filter material. The filter material may be a standard HEPA filter material, such as, but not limited to, polyproplyene. Hence, the embodiments disclosed herein may be used to create a HEPA filter.

A fan 130 may be provided. The fan 130 may comprise embedded electronics. Size and blade design of the fan may easily be suited for different or specific applications. The fan 130 may provide a pressure differential to draw contaminated air into the ECU 100 through the front grate 110 and through the filter 120. A housing 135 may be provided to contain the fan 130 and may further provide mounting surfaces for the filter 120 and a ducting unit 140. Housing clamps 145 may be included to provide retention of all internal components of the ECU 100. A clamp 150 may be provided to secure an electrolysis unit 160, which also may be included as part of the ECU 100. Thus, the electrolysis unit 160 may be included to introduce oxygen into the filtered air stream leaving from the fan 130. An oxygen injector nozzle 165 may be provided, which is designed to create suction force to draw oxygen into the air stream. The ducting assembly 140 may direct air and further function as a mixing zone for oxygen or moisture for controlling humidity levels into the filtered air stream. Further shown are clamping pins 170. The clamping pins 170 may be used to hold the duct 140 to the fan 130 with the housing 135 in between. The clamping pins may be configured to fit through holes in the housing 135, duct 140 and fan 130. Though clamping pins 170 are shown, any securing element or device may be used to hold these components together.

The ECU 100 may be shaped or designed to suit any particular application. Any one of the components, or all of the components illustrated may be created using an additive manufacturing device, such as, but not limited to, that taught in U.S. application Ser. No. 14/331,729 (the '729 application), now U.S. Pat. No. 11,077,607, incorporated herein by reference. As such, manufacturing may occur in the environment where the ECU 100 is used, such as, but not limited to, in a microgravity environment, a high-vibration environment, a varying external force environment, etc.

Thus, in operation, filtered air leaving from the filter 120 is then moved through the ducting unit 140 and flows past the injection nozzle 165 where oxygen and/or moisture may be introduced into the airstream and finally back in an area where individuals are located, such as, but not limited to, a crew environment, not shown. Such movement is accomplished with the fan 130. The oxygen is generated within the electrolysis unit 150 which strips the oxygen molecules from water that is contained/pumped/stored within. The components are located or formed to connect or attach to each other so that additional ducts or connectors are not required.

Figure 2:
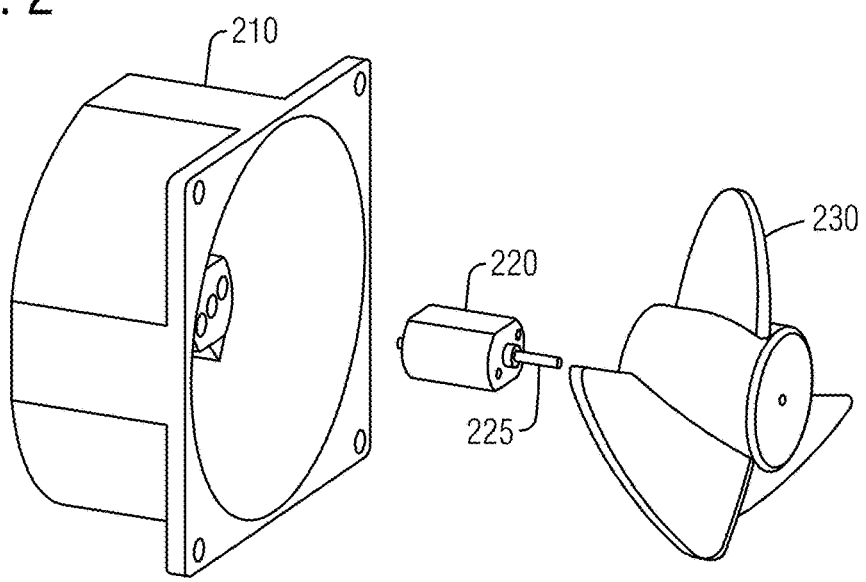
FIG. 2 shows an exploded view of the fan unit.

FIG. 2 shows an exploded view of the fan unit. As illustrated, the fan unit 130, or fan, may have a fan housing 210. A motor 220, having a motor shaft 225, may be embedded within the fan housing 220. Fan blades 230 may be attached to the motor shaft 225, such as, but not limited to, being pressed onto the motor shaft 225. As disclosed above, the fan housing 210 and the blades 230 may be manufactured using an additive manufacturing system, such as, but not limited to, that taught in U.S. application Ser. No. 14/604,743 (the '743 application), now U.S. Pat. No. 10,052,797, incorporated herein by reference, so that a prefabricated component (the motor 220) is included in a part that is being manufactured with an additive manufacturing process.

Figure 3:
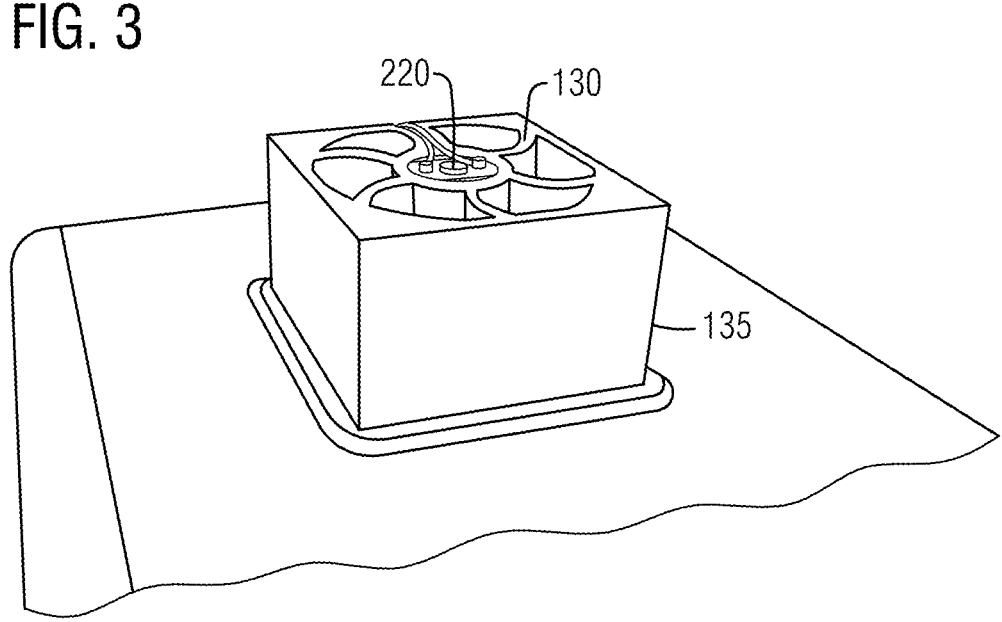
FIG. 3 shows an image of when the motor is embedded within the fan housing.

FIG. 3 shows an image of when the motor is embedded within the fan housing. As discussed above, the fan housing 135 and the fan blades may be created using additive manufacturing, as a singular component. During the additive manufacturing process, printing may be paused, during which time the motor 220 may be embedded or placed within the housing. Once the print process is resumed, the resulting component will include the motor embedded into the part.

By embedding the electric motor 220 in the fan housing, there is no need for mounting hardware which reduces system components. Other ways to embed the motor 220 could lead to the ability to change a failed motor instead of an entire fan assembly. As a non-limiting example, the additive manufactured component of the fan unit 130 into which the motor 220 is held may be manufactured with a latch or another securing element which can be physically manipulated to free the motor 220 from the fan unit 130. In another non-limiting example, the motor 220 may comprise an outer engagement connector that when pressed upon, such as, but not limited to, with a tool, will breakaway to allow the motor 220 to be freed from the fan unit 130.

Additionally, components may be designed around a one-size-fits-all motor which reduces the number of varying spare parts required to be stored on station or space craft. Additively manufacturing a fan unit 130 provides an opportunity to design the fan 220 to suit particular needs, i.e., higher rpm, lower drag or lower rpm, higher flow. It also provides the ability to easily tailor components to tight mission parameters.

Figure 4:
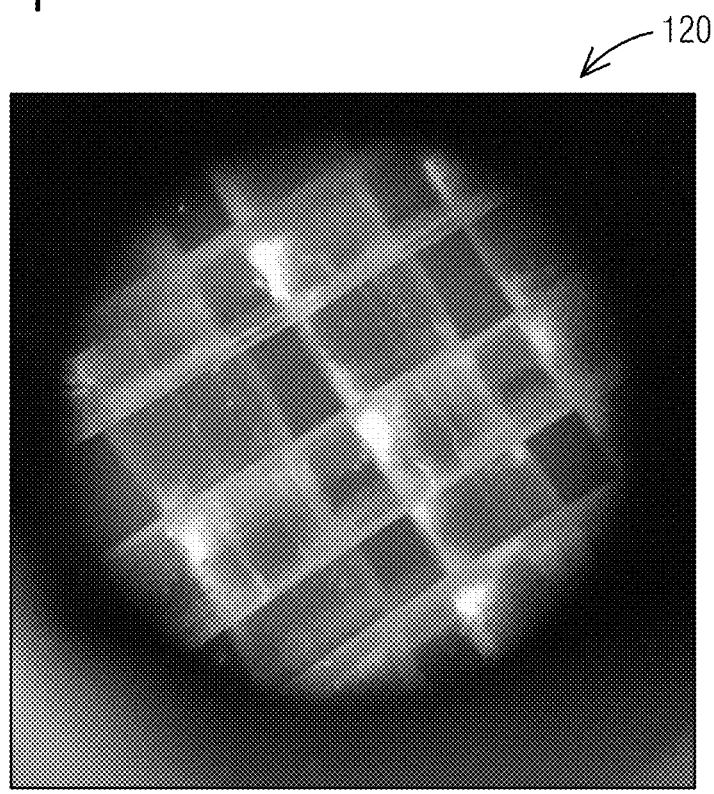
FIG. 4 shows an image of an exploded view of the filter as viewed through a microscope.

FIG. 4 shows an image of an exploded view of the filter as viewed through a microscope. As disclosed above, the filter 120 may comprise randomly sized and spaced fibers. By randomly laying the fibers onto one another during printing, filters may be created to suit a range of requirements. As a non-limiting example, fiber spacing may be established based on a number of individuals aboard the ISS or aboard a submarine. As used herein, "randomly" is used to mean both made or occurring without definite pattern and made with a definite pattern, only the pattern is not recognizable with a human eye.

Thus, during additive manufacturing, an additive manufacturing device does not melt all of the additive manufacturing filaments to form the filter, but instead only melts certain segments of the filaments so that passages through the filter 120 may be sized and oriented. With sizing and orientation of passages being randomly applied, layering of the filter during the additive manufacturing process may result in impeding varying sized particulates from continuing in the air stream after the airstream passes through the filter 120. This may be accomplished by operating the additive manufacturing device or system to produce the filter with at least a portion of the additive manufacturing filaments used to create the filter remaining unbonded to a previous laid additive manufacturing filament of the filter.

More specifically, the filter 120 may be manufactured through the use of a fused filament fabrication machine, commonly known as a 3D printer, where 'feedstock' is fed into the machine and small diameter fibers are laid down on top of one another in a controlled manner, layer by layer in order to manufacture the filter into any desired shape and thickness, so long as it fits within the bounds of the printer's build volume. As a non-limiting example, each layer may have varying fiber paths and be laid on top of one another without bonding completely (or selectively bonding) so as to create a "web" whereas the edges of the filter 120 may be printed with more layer adhesion and structured fiber path as to create the walls of the filter. Non-limiting examples of a 3D printer include, but are not limited to, a fused deposition modeling device and a raster-style device.

Because of the nature of additive manufacturing, the filter 120 may be made to any shape and size as defined by a mission requirement or intended purpose of the filter 120. A filter 120 may be made in a stackable assembly or as a single unit of the same thickness as the stackable assembly. A stackable filter benefits large particulate filter assemblies that may become clogged and need replacing. By enabling the ability to replace a section, or one layer of stacked filters, the waste production may be minimized since only individual layers may be replaced as needed, when compared to having to replace a single filter having a same thickness as the filter assembly. From another perspective though, constructing a thicker filter with a same thickness as a stackable filter may allow for greater randomness within the filter structure, which increases the effectiveness of the filter 120 as a whole by trapping smaller particulates in the way high-efficiency particulate air ("HEPA") filters work.

Figure 5:
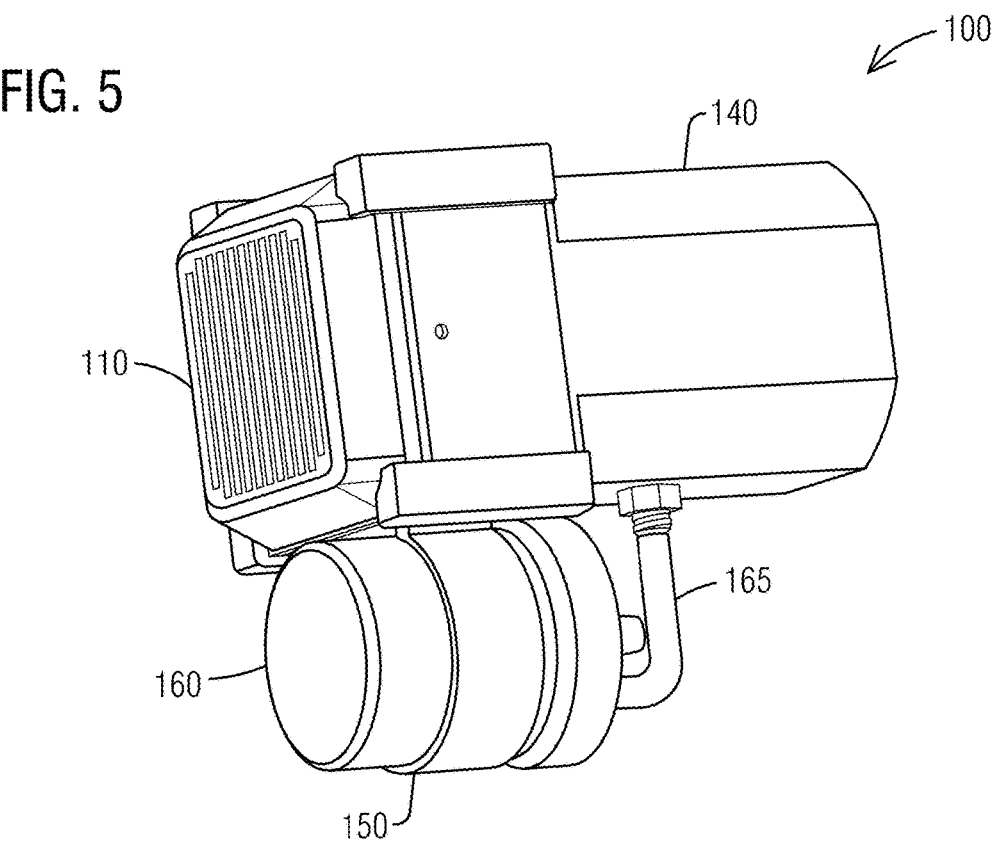
FIG. 5 shows an embodiment of a fully assembled ECU.

FIG. 5 shows an embodiment of a fully assembled ECU. As disclosed above, electrolysis unit 160 is not in the field of stream of the airflow starting outside of the ECU 100 and flowing through the filter 120 as propelled by the fan 130.

Figure 6:
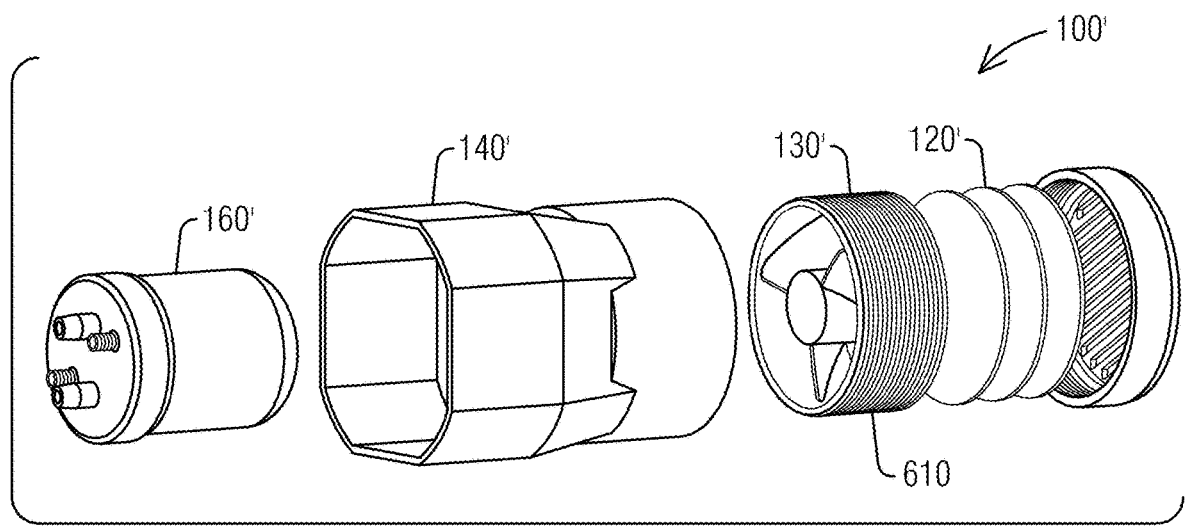
FIG. 6 shows another embodiment of an ECU.

FIG. 6 shows another embodiment of an ECU. This embodiment of the ECU 100' provides an alternative to holding the stacked filter 120' in place and allows for greater filter stacking ability as well. The fan 130, or fan unit, is central to the overall design providing a threaded base 610 by which to secure at least one filter 120' where multiple filters may have varied filtering grades, and the duct 140'. An electrolysis unit 160' may be provided. The electrolysis unit 160' may use electrical power to separate hydrogen and oxygen molecules from water and may port breathable oxygen into the filtered airstream while removing the hydrogen from within the ECU 100'. A ducting unit, or duct 140', may be included. The ducting unit 140' may provide the mounting and housing components of the electrolysis unit 160'. The ducting may be sized and/or scaled to suit any application.

An additively manufactured electric fan featuring embedded electronics provides the pressure differential to create air flow across the filters 120'. As disclosed above and as illustrated, the filters 120', or "air scrubbers," may comprise more than one where they may be stacked as needed to address individual applications. The filter 120' may also be easily removed and replaced by just releasing the filter housing grate 110'. The filter housing grate 110' may provide the clamping force, or securing force, that seals the filters 120' in the airstream and stops large particulate from damaging the filters 120'.

Though not shown, humidifiers and condensers may also be added to the ECU 100' and additive manufacturing may be used to produce those components as well. Heaters, also not shown, may also be made by resistance heating and may be created using similar construction methods. Thus, this arrangement may allow for a very modular design of the ECU 100'. The modular design could easily be scaled with many filters 120', fans 130', electrolysis units 160' and ducts 140'.

Figure 7:
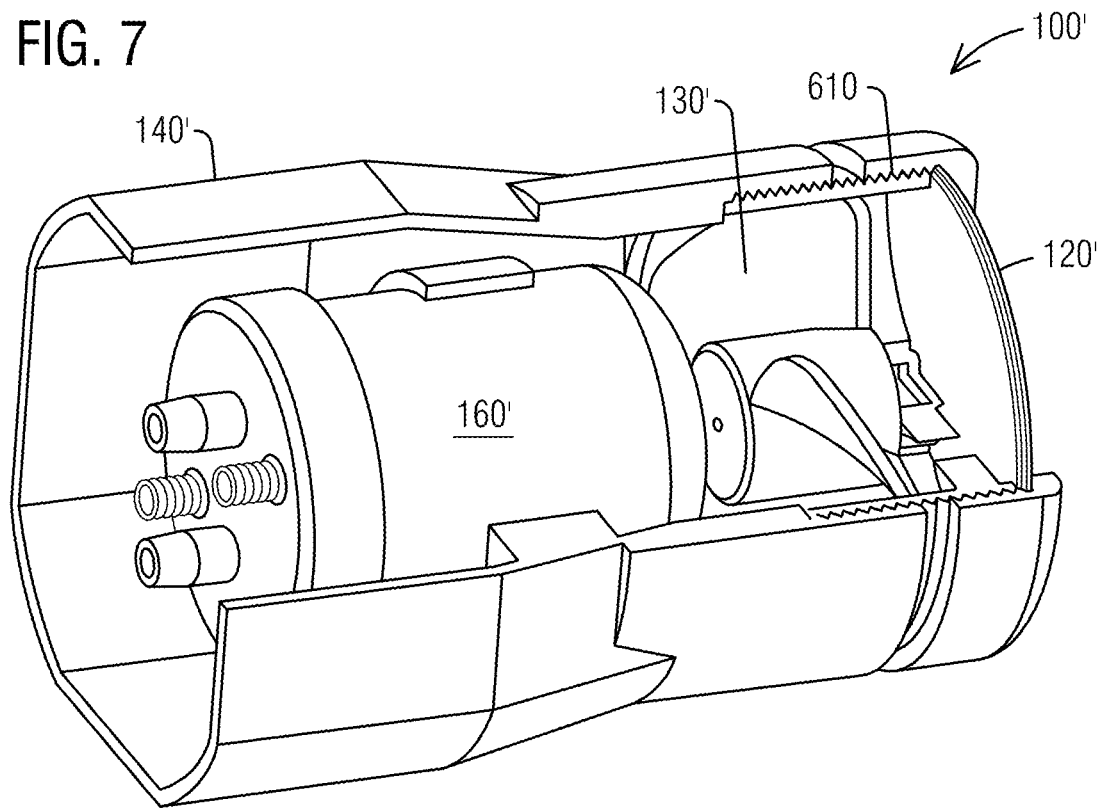
FIG. 7 shows an embodiment of a sectional view of fully assembled ECU using components shown in FIG. 6.

FIG. 7 shows an embodiment of a sectional view of fully assembled ECU using components shown in FIG. 6. As illustrated, the electrolysis unit 160' is within the air stream which already includes the fan 120' and stacked filters 130'.

Figure 8:
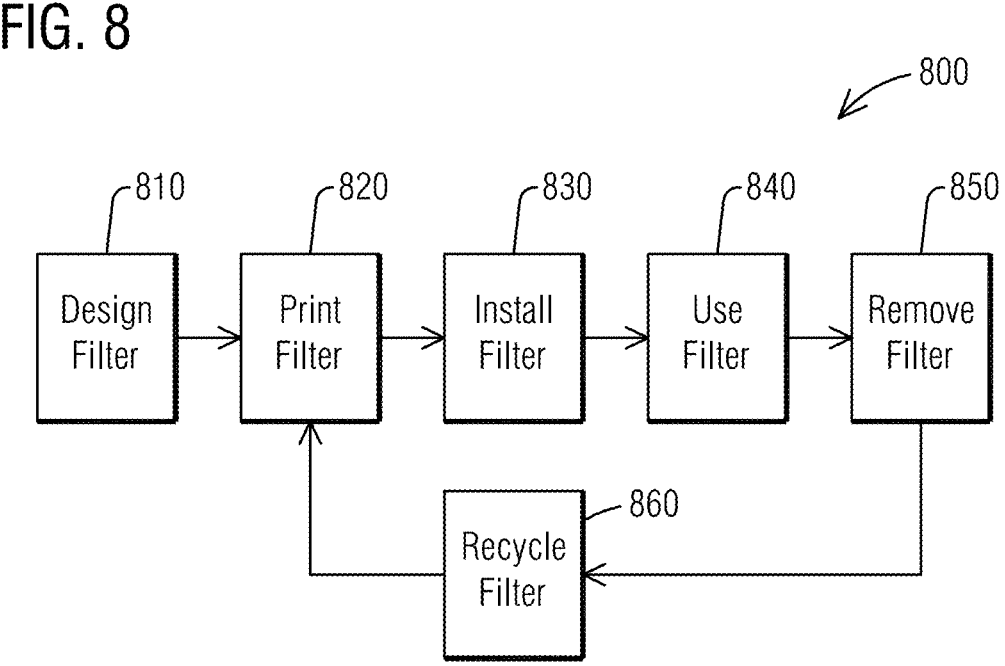
FIG. 8 shows an embodiment of a flowchart illustrating a method that provides for a close loop system of using recycled components.

FIG. 8 shows an embodiment of a flowchart illustrating a method that provides for a close loop system of using recycled components. Though FIG. 8 is shown as being specific to the filter 120, 120', the steps identified may be applicable to any component or the complete system disclosed above. As shown with respect to the filter 120, 120', a design is determined for the filter. The method 800 may include having the design of the filter determined or designed, at 810, which may be based on a specific function the filter 120, 120' is intended to perform. As a non-limiting example, the design may be particular with respect to being sized and oriented so that layering of the filter may impede varying sized particulates from entering the air stream. Thus, the method 800 may include using a 3D printer, such as, but not limited to, that taught in the '729 application, incorporated herein by reference. The filter may be printed, at 820, created, or manufactured. This print step takes place in the environment in which the filter is being used, which may be a pressurized environment, microgravity environment a high-vibration environment, a varying external force environment, etc. Thus, if the filter is for use in space, the printing occurs in space. Next, the filter is installed within the ECU 100, at 830. The filter is then used, at 840, for its intended purpose. Once its operational lifecycle has concluded, the filter is removed, at 850. The filter is then recycled, at 860, as taught in the '743 application, incorporated by reference, so that the material that composes the filter is used to create another filter or another component or part.

Figure 9:
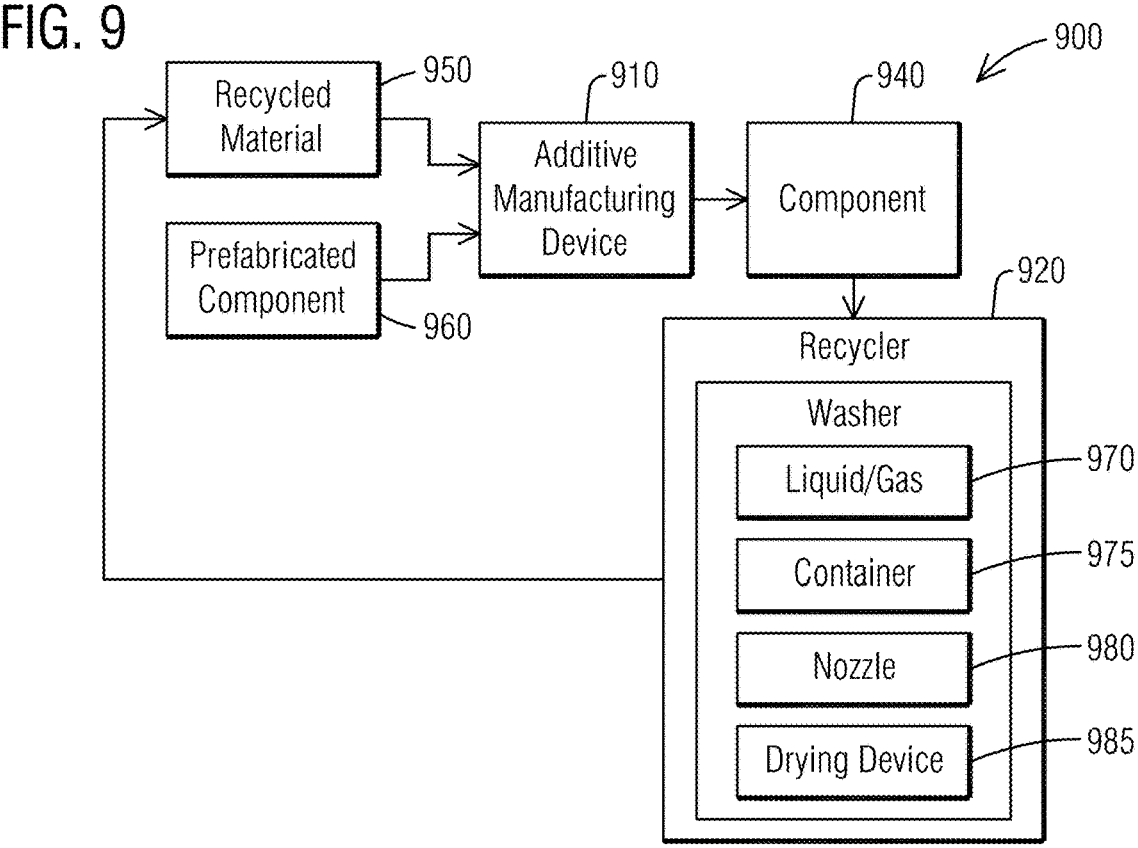
FIG. 9 shows an embodiment of a system.

Thus, as taught in the '743 application, a recycler device 920 (as shown in FIG. 9) capable of functioning in the environment that the component is used is provided. Also, the additive manufacturing device 910, as taught in the '729 application, also functions in the environment.

FIG. 9 shows a block diagram illustrating an embodiment of a method in association with a system. As discussed above, an additive manufacturing device or system or subsystem 910 is disclosed. Also shown is a recycler 920. The recycler 920 may be either a separate device or part of the additive manufacturing device or system. The recycler 920 would melt down or break down the component to provide for, or convert, material used to create the replacement component, such as, but not limited to, to produce a filament or other feedstock which may be reused by the manufacturing system or additive manufacturing device. Thus, in addition to breaking down the component, the filament is configured or arrange for use within the additive manufacturing device. As a non-limiting example, if the additive manufacturing device uses strands or spools of filaments, the recycler produces the filaments or other feedstock in the configuration needed.

For a component which may have foreign particulates, contaminants or other debris attached to an outside a surface, the breaking down of the component will result in a material used to manufacture in which the particulates may be within the material. As use herein, the term "particulates" include microscopic solid or liquid matter, dirt, corrosion, etc. Another term used herein is debris and contaminants. As used herein, each of these terms may be used interchangeably. This would result in the outer surface of the material being free from the foreign particulate, or cleaned. As a non-limiting example, the filter 120 may be broken down within the recycler where the resulting recycled material provides for the foreign particulates within the recycled material so that when the recycled filter is manufactured within the additive manufacturing device, the surface of the filter is without, or free of, the particulates. In this fashion, there is no need to clean or wash the material either before or after the recycling process. Removing the cleaning or washing requirement saves on resources when this is occurring in the environment where the ECU is used. As a non-limiting example, in a microgravity environment, using a resource like water to clean is not needed.

As explained above with respect to the filter 120, not only is the material of the filter recycled, but so are the particulates that the filter may have been used captured. Though the recycled material from the filter may be less pure with the particulates embedded, at least one recycled replacement filter may be made which will function to capture particulates at a same rate or slightly less efficiency as the original component. Less efficiency may be realized if a recycled particulate is located or at a surface of the recycled filter in which that particulate may break away from the recycled filter during use. To improve efficiency, recycled material from the filter may be used for another recycled component whereas recycled material from another component may be used for the filter. Since the other component is not primarily used to capture particulates, fewer particulates will be introduced in the recycled filter. A non-example of the material that is recycled is polypropylene.

Though additive manufacturing of individual components is discussed above, in an embodiment, during one fluid, or continuous, process, all components of the ECU may be printed. In this fashion, instead of bifurcating the manufacture of each component into separate print processes and then assembling the components, the complete ECU is manufactured as a whole, or unitary, unit during a single additive manufacturing process.

As further illustrated in FIG. 9, the additive manufacturing device 910 creates a remanufactured component 940. Once the original component or remanufactured component 940 has met its life cycle or has failed, either timely or prematurely, it is placed within the recycler 920. With respect to FIG. 9, the terms "remanufactured component," "original component" and "component" are used interchangeably as the recycle process is the same for each. The resulting product from the recycler is recycled material 950. As disclosed above, the recycled material may include foreign debris that has attached to the component 940 prior to recycling. The recycled material 950 is then used within the additive manufacturing device 910 to create the new product. As discussed above, for some components 940, a prefabricated component 960, such as, but not limited to, a motor, other electronics, electrical wires, etc., may be included in the recycled component by way of the additive manufacturing device 910.

A washer device 970 or cleaning device may be part of the recycler 920. The washer 970 may provide for a liquid 975 to wash the component 940 before it is recycled. The washer 970 may comprise a retaining container 980 to hold the used liquid. In another embodiment, the washer 970 may provide for a propelled gas 975 to blow any particulates from the component 940 prior to recycling. The liquid or gas may be considered a cleaning agent 975. Thus, a nozzle 985 is part of the washer 970 to either produce the liquid or gas directed towards a location where the component to be recycled is located. When a liquid, the container 980 is provided to collect the liquid expended or the particulates dislodged by the gas. A drying device 985 may also be included to remove any moisture from the component prior to recycling the component. The drying device 985 may be a heating element or a device retaining a cloth which is rubbed against the component. By utilizing the washer 970, the resulting recycled material is without the particulates or debris. Hence, the resulting recycled component manufactured may have properties similar to those of the original component.

From a broader perspective, FIG. 9 shows an embodiment of a system 900. The system comprises an environmental control unit. In an embodiment, the ECU comprises a fan to control a flow of air in an airstream, a filter located within the air stream to filter particulates from the airstream, a duct to contain the air stream, and an electrolysis unit in the airstream. The system 900 also comprises a recycler to breakdown at least one of the fan, filter, duct and electrolysis into a recycled additive manufacturing filament, and an additive manufacturing device to receive the recycled additive manufacturing filament to create at least one of the fan, filter, duct and electrolysis with an additive manufacturing process. In an embodiment, the recycler breaks down the at least one of the fan, filter, duct and electrolysis where any debris attached to the at least one of fan, filter, duct and electrolysis is included within the recycled additive manufacturing filament. In another embodiment, the recycler may further comprise a cleaner to remove any debris attached to the at least one of fan, filter, duct and electrolysis prior to creating the recycled additive manufacturing filament.

Figure 10:
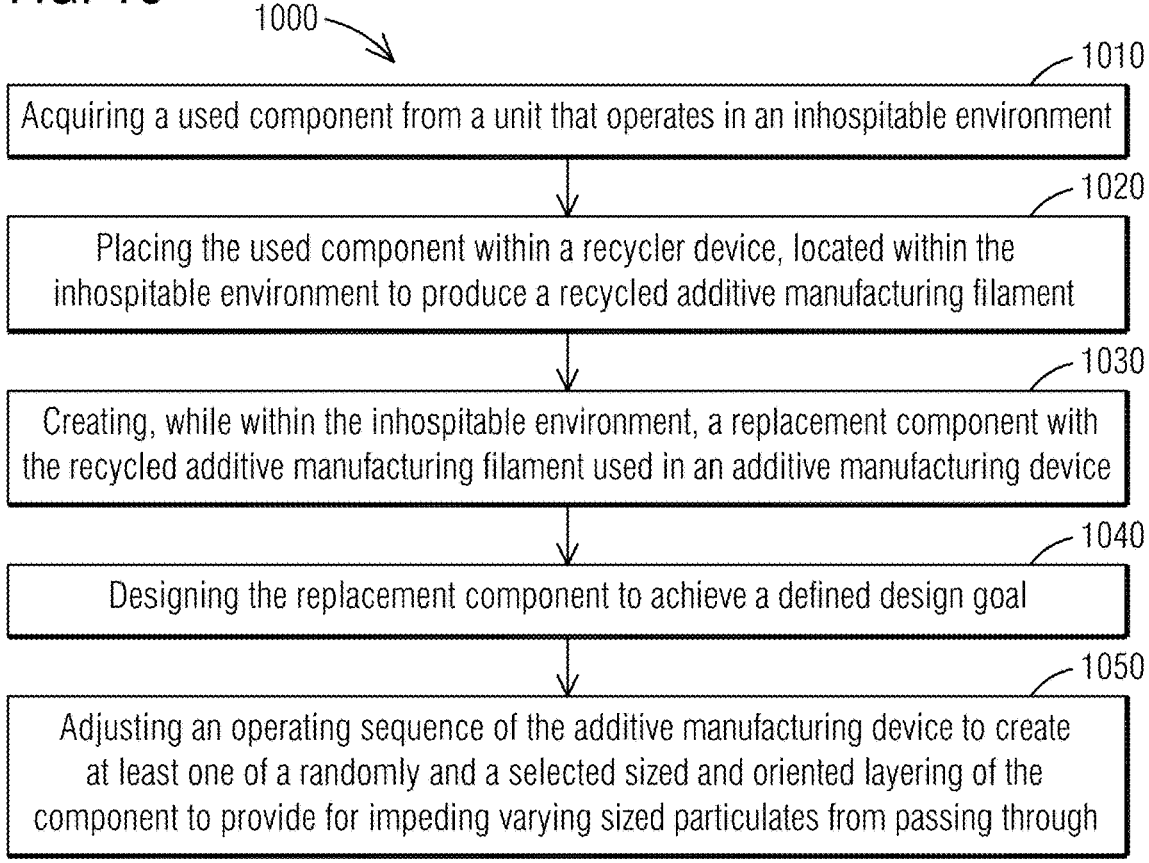
FIG. 10 shows another embodiment of a flowchart illustrating a method.

FIG. 10 shows another flowchart of an embodiment of a method. The method 900 comprises acquiring a used component from a unit that operates in an inhospitable environment, at 1010. The method 1000 also comprises placing the used component within a recycler device located within the inhospitable environment to produce a recycled additive manufacturing filament, at 1020. The method also comprises creating, while within the inhospitable environment, a replacement component with the recycled additive manufacturing filament used in an additive manufacturing device, at 1030.

The method 1000 may further comprise designing the replacement component to achieve a defined design goal, at 1040. As disclosed above, the component may be a subsystem of an environmental control unit. Thus, the subsystem may comprise at least one of an entrance grill, a sealing component, a filter, a fan, a duct, a securing component, an electrolysis unit and an oxygen injector nozzle. With respect to a component that may require a passageway, such as, but not limited to, of a micrometer, or nanometer diameter, the method 1000 may further comprise adjusting an operating sequence of the additive manufacturing device to create at least one of randomly and selected sized and oriented layering. With respect to the filter, this may provide for impeding varying sized particulates from passing through the filter, at 1050. In another embodiment, the method 1000 may further comprise operating the additive manufacturing device to produce the filter with at least a portion of the additive manufacturing filaments used to create the filter remaining unbonded to a previous laid additive manufacturing filament of the filter.

Figure 11:
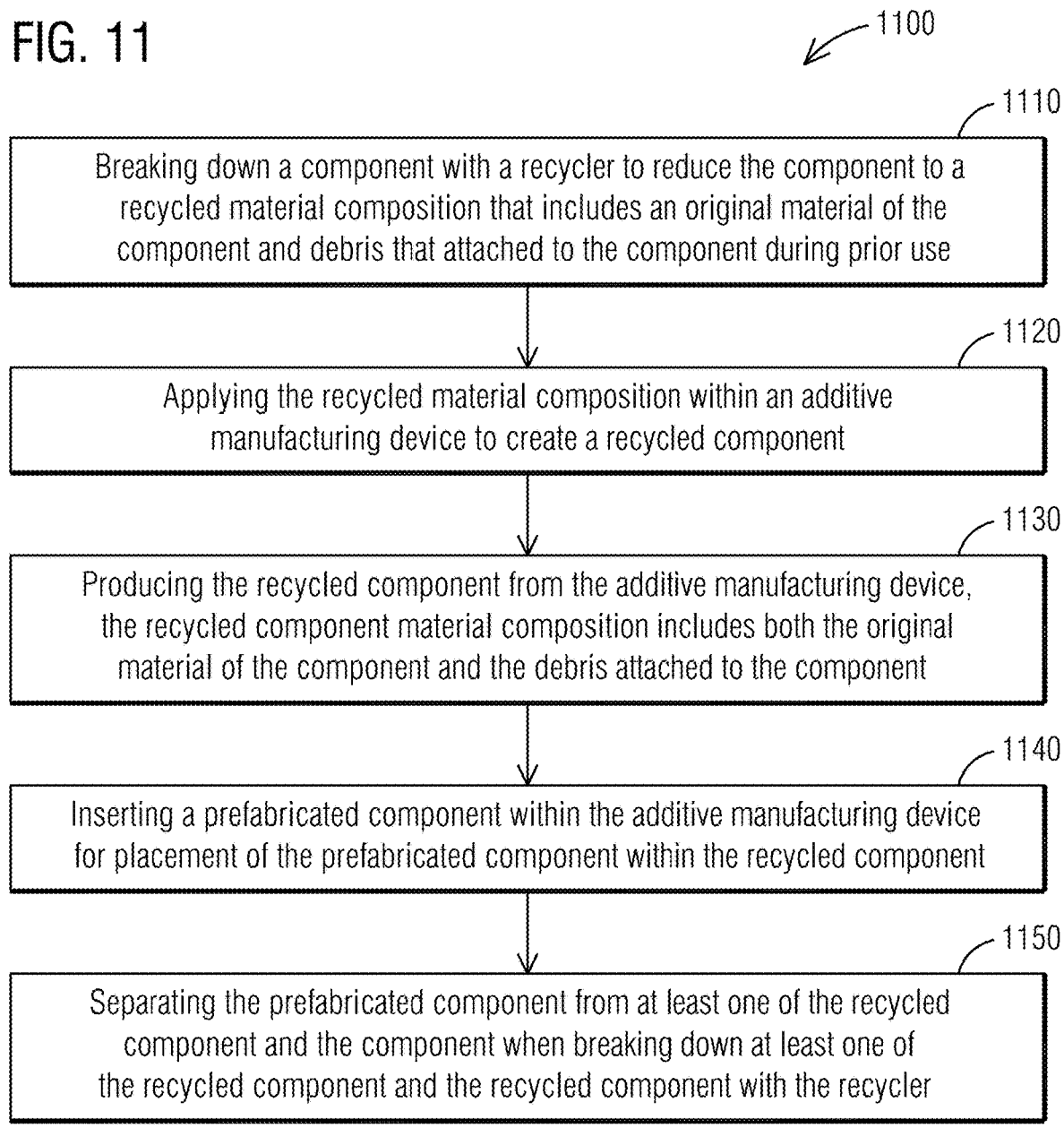
FIG. 11 shows another embodiment of a flowchart illustrating a method.
Figure 12:
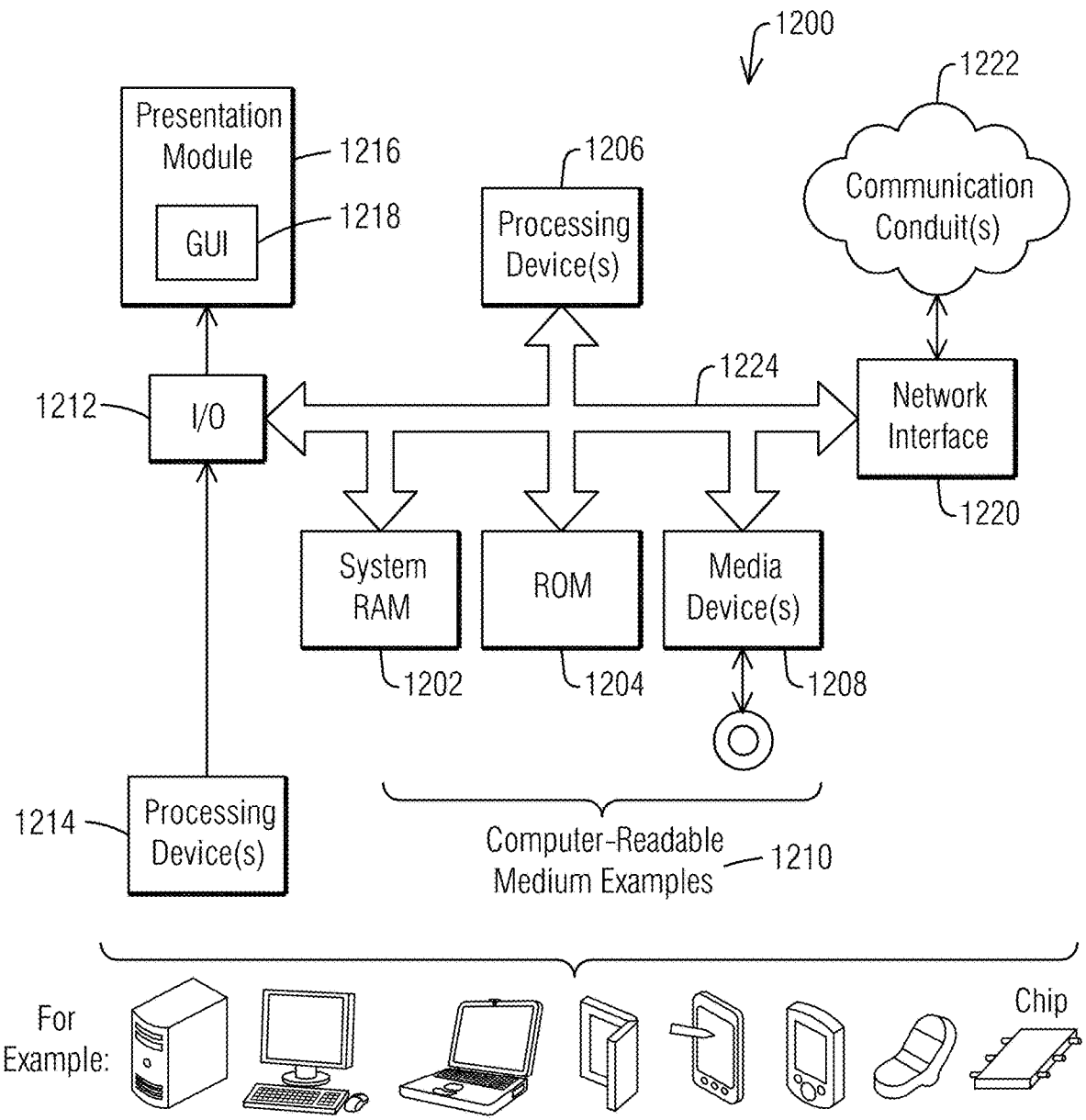
FIG. 12 shows a block diagram illustrating an embodiment of a computer system.

FIG. 11 shows another flowchart of an embodiment of a method. The method 1100 comprises breaking down a component with a recycler to reduce the component to a recycled material composition that includes an original material of the component and debris that attached to the component during prior use, at 1110. The method 1100 further comprises applying the recycled material composition within an additive manufacturing device to create a recycled component, at 1120. The method 1100 further comprises producing the recycled component from the additive manufacturing device, the recycled component material composition comprising both the original material of the component and the debris attached to the component, at 1130.

The method may further comprise inserting a prefabricated component within the additive manufacturing device for placement of the prefabricated component within the recycled component, at 1140. The prefabricated component may be an electrical component, such as, but not limited to, a motor or electrical wiring. The method may further comprise separating the prefabricated component from at least one of the recycled component and the component when breaking down at least one of the component and the recycled component with the recycler, at 1150.

When the at least one of the component and the recycled component comprise a filter, the method may further comprise adjusting an operating sequence of the additive manufacturing device to create at least one of randomly and selected sized and oriented layering of the filter to provide for impeding varying sized particulates from passing through the filter. When the at least one of the component and the recycled component comprise a filter, the method may further comprise operating the additive manufacturing device to produce the filter with at least a portion of the additive manufacturing filaments used to create the filter remaining unbonded to a previous laid additive manufacturing filament of the filter. The at least one component and recycled component comprise an environmental control unit that comprises an entrance grill, a sealing component, a filter, a fan, a duct, a securing component, an electrolysis unit and an oxygen injector nozzle wherein producing the recycled component comprises producing the entrance grill, sealing component, filter, fan, duct, securing component, electrolysis unit and oxygen injector nozzle during a fluid operation of the additive manufacturing device.

Though the use of recycled filaments is primarily discussed herein, the filaments used to create the recycled component may comprise unused, or virgin (or previously unused), filaments or feed stock, and/or recycled filaments or feedstock where the recycled filaments may either include debris or does not include the debris (or at least has been cleaned during the recycling process). As a non-limiting example, the filaments may comprise virgin filaments and recycled filaments with contaminants within. In another non-limiting example, the filaments may comprise virgin filaments and recycled filaments without contaminants within. The filaments may also comprise virgin filaments. Thus, as discussed herein, the contaminants may be sequestered inside or within the polymer filament. This may enable creation of new and effective filters and other objects to be produced. Additionally, the speed of deposition of the layering, by the additive manufacturing device may be varied to create fibers in the filter of varying widths and to selectively avoid bonding. The speed variation may be determined, controlled, by a controller, as discussed with respect to FIG. 11.

A benefit of using additively manufactured filters 120, 120' as air scrubbers provides for being able to recycle and reuse the material, thus creating a loop scenario minimizing the need to carry replacement filters, outside of the initial feedstock material. Additionally, filters can be quickly designed and printed to fit changing needs. Their fiber size and thickness can be altered along with the spacing and randomness of the fibers which makes it easy to tailor filters to particular environmental filtering needs. This allows for the most efficient use of materials.

Thus, as disclosed above, a design for the additive manufactured environmental control unit 100, 100' may feature all additive manufactured components as well as some embedded electronics where necessary. Certain components, such as, but not limited to, the filter 120, 120' is additively manufactured so that passages are formed through the filter 120, 120' to block particulates from passing through the filter 120, 120'. The additive manufacturing device is able to not melt all of the additive manufacturing filaments while creating the filter 120, 120' to provide for such passages.

Upgrades to the manufacturing technologies can be integrated as developed to improve the efficiency of the system. In addition to the mentioned components, all ducting and structural elements, including large particulate grates, can be made with additive manufacturing.

Traditional air handler/scrubbers require oxygen tanks or a generation system if oxygen is being added to the filtered air stream. With the addition of the electrolysis unit within the air stream, as illustrated in FIGS. 6 and 7, oxygen can be added to the filtered air stream in a scaleable manner without the use of high pressure tanks, which reduces the probability of experiencing a potentially catastrophic failure mode.

FIG. 11 shows an illustrative computer system that may be used to implement computing functionality, which in all cases represents one or more physical and tangible processing mechanisms. As disclosed above, the computing functionality 1100 may be used to create at least one component of the ECU. As a non-limiting example, to produce the filter 120 disclosed above, the computing functionality 1100 may be used to create the varied orientation and sizing of opening in the filter 120. As another non-limiting example, the computing functionality 1100 controls the functions of the recycler 920.

The computing functionality 1100 may comprise volatile and non-volatile memory, such as RAM 1102 and ROM 1104, as well as one or more processing devices 1106 (e.g., one or more central processing units (CPUs), one or more graphical processing units (GPUs), and the like). The computing functionality 1100 also optionally comprises various media devices 1108, such as a hard disk module, an optical disk module and so forth. The computing functionality 1700 may perform various operations identified above when the processing device(s) 1106 execute(s) instructions that are maintained by memory (e.g., RAM 1102, ROM 1104 and the like).

More generally, instructions and other information may be stored on any computer readable medium 1110, including, but not limited to, static memory storage devices, magnetic storage devices, and optical storage devices. The term "computer readable medium" also encompasses plural storage devices. In all cases, computer readable medium 1110 represents some form of physical and tangible entity which is non-transitory. By way of example, and not limitation, the computer readable medium 1110 may comprise "computer storage media" and "communications media."

"Computer storage media" may comprise volatile and non-volatile, removable and non-removable media implemented in any method or technology for storage of information, such as computer readable instructions, data structures, program modules, or other data. Computer storage media may be, for example, and not limitation, RAM 1102, ROM 1104, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

The "communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

The computing functionality 1100 may also comprise an input/output module 1112 for receiving various inputs (via input modules 1114), and for providing various outputs (via one or more output modules). One particular output module mechanism may be a presentation module 1116 and an associated GUI 1118. The computing functionality 1100 may also include one or more network interfaces 1120 for exchanging data with other devices via one or more communication conduits 1122. In an embodiment, one or more communication buses 1124 may communicatively couple the above-described components together.

The communication conduit(s) 1122 may be implemented in any manner (e.g., by a local area network, a wide area network (e.g., the Internet), and the like, or any combination thereof). The communication conduit(s) 1122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. An environmental control unit, the environmental unit comprising a particulate filter located within an airstream, the filter comprising additive manufacturing filaments deposited in a pattern such that at least one of randomly sized layering of the filaments of the filter and randomly oriented layering of the filaments of the filter provide for impeding varying sized particulates from passing through the filter and at least one of the additive manufacturing filaments of the deposited pattern being selectively unbonded to a previous laid additive manufacturing filament of the filter.

2. The environmental control unit according to claim 1, wherein the additive manufacturing filaments comprise at least one of recycled filaments, previously unused filaments, and a combination of recycled filaments and unused filaments.

3. The environmental control unit according to claim 2, wherein the recycled filaments are created from a prior used filter having used filaments, which comprise prior used polymer and at least one contaminant from the prior used filter.

4. The environmental control unit according to claim 3, wherein the at least one contaminant is sequestered within the recycled filaments.

5. The environmental control unit according to claim 1, wherein the deposited pattern is created using an additive manufacturing device that comprises at least one of a fused deposition modeling device and a raster-style device.

6. The environmental control unit according to claim 1, wherein the environmental control unit further comprises, in line, a fan to control a flow of air in the airstream, a duct located around the fan to contain the airstream, and an electrolysis unit in the airstream, and wherein the filter is located within the airstream.

7. The environmental control unit according to claim 6, wherein the fan, the duct, the electrolysis unit and the filter are created as a unitary environmental control unit during an operation of the additive manufacturing device.

8. The environmental control unit according to claim 1, wherein a material composition used to create the filter comprises a recycled material composition produced by a recycler which converted a prior used filter into the additive manufacturing filaments.

9. The environmental control unit according to claim 8, wherein the recycler comprises a cleaning device to apply at least one of a liquid and a gas to remove debris from the prior used filter.

10. The environmental control unit according to claim 1, wherein the at least one of the randomly sized layering of the filaments in the filter and the randomly oriented layering of the filaments in the filter is created by varying a speed of deposition of a material composition by an additive manufacturing device to create the filaments in the filter with varying widths and to selectively avoid bonding.

11. The environmental control unit according to claim 1, further comprising a fan to control a flow of air, a duct located around the fan, and an electrolysis unit.

12. A filter created with an additive manufacturing device, the filter comprising:
    additive manufacturing filaments comprising recycled material deposited in a pattern by the additive manufacturing device such that the deposited pattern includes at least one of randomly sized layering of one or more filaments of the additive manufacturing filaments and randomly oriented layering of at least one filament of the additive manufacturing filaments to provide for impeding varying sized particulates from passing through the filter; and at least a portion of the filaments of the additive manufacturing filaments of the deposited pattern being selectively unbonded to a previous laid additive manufacturing filament of the filter,
    the recycling material from a prior used component comprising additive manufacturing material.

13. The filter according to claim 12, wherein the recycled material comprises recycled filaments.

14. The filter according to claim 13, wherein the component comprises a prior used filter and the recycled filaments are created from the prior used filter having used filaments, which comprise prior used polymer and at least one contaminant from the prior used filter.

15. The filter according to claim 12, wherein the filter is configured for placement within an airstream of an environmental unit to function as a particulate filter.

16. The filter according to claim 12, wherein the additive manufacturing filaments form a web created by an additive manufacturing device; and
    further comprises:
        filter edges, and
        filter walls printed with layer adhesion by the additive manufacturing device.

17. The environmental control unit according to claim 1, wherein the additive manufacturing filaments form a web created by an additive manufacturing device; and
    further comprises:
        filter edges, and
        filter walls printed with layer adhesion by the additive manufacturing device.

18. A filter created with an additive manufacturing device, the filter comprising:
    additive manufacturing filaments deposited in a pattern by the additive manufacturing device such that the deposited pattern includes at least one of randomly sized layering of one or more filaments of the additive manufacturing filaments and randomly oriented layering of at least one filament of the additive manufacturing filaments to provide for impeding varying sized particulates from passing through the filter; and at least a portion of the filaments of the additive manufacturing filaments of the deposited pattern being selectively unbonded to a previous laid additive manufacturing filament of the filter.

* * * * *